US008781277B2

(12) United States Patent
Wells et al.

(10) Patent No.: US 8,781,277 B2
(45) Date of Patent: Jul. 15, 2014

(54) OPTICAL FIBER CABLE HAVING DUMMY RODS WITH NON-CIRCULAR CROSS-SECTION

(75) Inventors: Ben Wells, Columbia, SC (US); Glenn Falk, Blythewood, SC (US)

(73) Assignee: Prysmian S.p.A., Milan (IT)

( * ) Notice: Subject to any disclaimer, the term of this patent is extended or adjusted under 35 U.S.C. 154(b) by 238 days.

(21) Appl. No.: 13/384,043

(22) PCT Filed: Jul. 13, 2009

(86) PCT No.: PCT/US2009/050383
§ 371 (c)(1),
(2), (4) Date: Mar. 27, 2012

(87) PCT Pub. No.: WO2011/008194
PCT Pub. Date: Jan. 20, 2011

(65) Prior Publication Data
US 2012/0177331 A1 Jul. 12, 2012

(51) Int. Cl.
*G02B 6/44* (2006.01)
(52) U.S. Cl.
USPC .......................................... 385/100; 385/109
(58) Field of Classification Search
USPC ....................................................... 385/100
See application file for complete search history.

(56) References Cited

U.S. PATENT DOCUMENTS

| 4,550,976 | A | 11/1985 | Cooper et al. |
| 5,229,851 | A | 7/1993 | Rahman |
| 6,066,397 | A | 5/2000 | Risch et al. |
| 6,374,023 | B1 | 4/2002 | Parris |
| 6,463,199 | B1 | 10/2002 | Quinn et al. |
| 6,847,768 | B2 | 1/2005 | Lail et al. |
| 6,922,512 | B2 | 7/2005 | Nechitailo |
| 7,277,615 | B2 | 10/2007 | Greenwood et al. |
| 2002/0084099 | A1 | 7/2002 | Persson |
| 2004/0076386 | A1* | 4/2004 | Nechitailo .................... 385/100 |

FOREIGN PATENT DOCUMENTS

| CA | 2 266 991 A1 | 9/1999 |
| EP | 1 215 686 A2 | 6/2002 |
| EP | 1 411 378 A2 | 4/2004 |
| JP | 08-82728 | 3/1996 |

OTHER PUBLICATIONS

International Search Report from the European Patent Office for International Application No. PCT/US2009/050383, mailing date Feb. 8, 2010.

* cited by examiner

*Primary Examiner* — Uyen Chau N Le
*Assistant Examiner* — Kajli Prince
(74) *Attorney, Agent, or Firm* — Finnegan, Henderson, Farabow, Garrett & Dunner, L.L.P.

(57) ABSTRACT

An optical fiber cable comprising a polymeric jacket and at least one elongated buffer tube having a substantially circular cross-section and at least one optical fiber disposed within the at least one buffer tube. The optical fiber cable further comprises at least one dummy rod having a substantially non-circular cross-section, wherein the cross-sectional area of each dummy rod is at least 10% less than the cross-sectional area of the at least one elongated buffer tube along a majority of the length of the at least one dummy rod.

13 Claims, 4 Drawing Sheets

OPTICAL FIBER CABLE HAVING DUMMY RODS WITH NON-CIRCULAR CROSS-SECTION

TECHNICAL FIELD

The present disclosure relates generally to optical fiber communication cables and, more particularly, to optical fiber communication cables having dummy rods for stranded loose-tube cables and stranded ribbon-in loose tube cables.

BACKGROUND

Optical fiber cables typically include a plurality of thin glass or plastic optical strands or "fibers," each of which is configured as a medium through which high-frequency lightwave signals may be passed. For protection and organization, the plurality of fibers may be divided into groups, with each group being placed within its own protective tube or channel called a "buffer" tube.

There are various configurations of optical fiber cables for transmitting information, including: central loose tube cables, which generally comprise a central buffer tube containing one or more optical fibers; stranded loose tube cables, which generally comprise a plurality of buffer tubes stranded in a helical or reverse oscillation ("S-Z") lay around a central strength member; and cables with slotted cores, which generally comprise a solid central core member having a plurality of grooves formed within the outer edge of the core member and into which a plurality of fibers may be placed.

A stranded loose tube cable typically includes a plurality of optical fibers that may be divided into groups, with each group being placed within a protective plastic or polymeric buffer tube. The buffer tubes are stranded around a central strength member, which increases the tensile strength of the cable and limits tensile and/or compressive stress that may be imposed upon the individual fibers during installation and use. The buffer tubes and central strength member may be housed in a protective polymeric jacket or sheath, which limits the exposure of the optical fibers to the surrounding environment. The buffer tubes and protective polymeric jacket may be filled with water-blocking substances and/or materials for blocking the ingress/propagation of water both inside the buffer tubes and in the interstices between the buffer tubes and the protective jacket. See, for example, U.S. Pat. No. 5,229,851, which is incorporated herein by reference in its entirety.

Typically, stranded loose tube cables have a plurality of buffer tubes, each buffer tube having a plurality optical fibers disposed therein. In an effort to maximize the structural integrity of the cable, the buffer tubes, central strength member, and diameter of the protective jacket may each be designed to limit or minimize movement of the buffer tubes within the protective jacket. One exemplary design uses six buffer tubes, each sized appropriately to fit precisely between the central strength member and the inner diameter of the protective jacket, thereby minimizing movement of the position of each buffer tube within the cable.

Cable manufacturers often customize certain design criteria of the optical fiber cable. For example, one customer may require a 72-fiber optical fiber cable (six buffer tubes, each containing 12 fibers), while another customer may require a 60-fiber cable (five buffer tubes, each containing 12 fibers). In order to flexibly accommodate customer requirements and maintain structural integrity of the cable without requiring a complete redesign of the optical fiber cable, cable manufacturers may replace any unused buffer tubes with dummy rods.

Dummy rods are elongated elements typically constructed of polymeric material that have the same or similar features (e.g., diameter, water blocking capabilities, etc.) as the buffer tubes. Importantly, dummy rods are substantially less expensive to manufacture than buffer tubes containing optical fibers and waterproofing materials. As such, where customer specifications require fewer buffer tubes than a particular type of optical fiber cable was designed to incorporate, dummy rods having the same dimensions as buffer tubes but lacking any optical fibers may be substituted for buffer tubes and perform as "simulated buffer tubes."

Dummy rods help to maintain the structural integrity of the cable when fewer buffer tubes are desired for a particular cable design, thereby mitigating costs associated with manufacturing a customized cable. Furthermore, the use of dummy rods allows cable manufacturing lines to make cables of varying fiber counts without substantial modification to the equipment setup, thereby avoiding otherwise costly variations to the cable manufacturing and processing equipment. For example, cables having 12, 18, 24, or 36 fiber counts can be manufactured having the same basic cable structure and diameter and using the same cable processing equipment, despite having differing fiber counts and/or requiring different numbers of buffer tubes.

Conventionally dummy rods are designed with substantially the same diameter as the buffer tubes so that the stranding of the buffer tubes (and dummy rod(s)) is uniform without creating space for the buffer tubes to move. The dummy rod is generally made of similar material(s) as the buffer tubes to insure that thermal and mechanical performance is the same as the buffer tubes.

For example, U.S. Pat. No. 4,550,976 ("the '976 patent"), which is incorporated herein by reference in its entirety, teaches a "dummy tube" having essentially the same outside diameter as the buffer tube and comprising a core means "circumscribed" by a coating of foamed plastic. The core may be a monofilament (or a plurality of monofilament strands twisted around one another) or a metallic material, such as steel. The coating of foamed plastic is then "circumscribed" about the monofilament or metallic core.

The '976 patent notes that conventional dummy tubes are typically constructed as a solid rod of the same material used to make the buffer tubes. Furthermore, the '976 patent suggests that materials used to make buffer tubes tend to be expensive and that certain other, cheaper materials may be substituted without having an adverse effect on dummy tube performance. Accordingly, the '976 patent suggests that a less expensive dummy tube may be constructed using a monofilament or steel core surrounded by a less expensive foamed plastic than is used for the buffer tubes.

Another dummy rod design is described in U.S. Pat. No. 6,066,397 ("the '397 patent"), which is incorporated herein by reference in its entirety. The '397 patent describes a dummy rod (therein named as "filler rod") that is constructed of a polypropylene homopolymer, a polypropylene-polyethylene copolymer resin, or a polypropylene-polyethylene copolymer having a nucleating agent disbursed therein. The resin material is foamed during extrusion so as to create a plurality of void spaces, which aids in reducing density relative to unfoamed material.

The foamed dummy rod design of the '397 patent may realize a reduction in density when compared to conventional "solid" dummy rods. Such density reduction may use less material during manufacture and, therefore, may reduce costs associated with manufacturing the dummy rods. However, the foamed dummy rod of the '397 patent does not appear to provide a significant reduction in cross-sectional area relative to conventional "solid" dummy rods. By not significantly reducing the cross-sectional area of the dummy rod, the overall reduction in material cost realized by foamed dummy rods when compared with the conventional dummy rod designs may be limited.

U.S. Pat. No. 6,922,512 ("the '512 patent") describes a fiber optic cable having a plurality of buffer tubes and filler rods disposed between the inner surface of the outer jacket of the fiber optic cable and the buffer tubes containing a plurality of optical fibers. The cross-sectional shape of the filler rods of the '512 patent is designed to match the cross-sectional shape of the interstitial gaps found in the cable between the buffer tubes and the cable outer jacket, of the cable. The filler rods have a core and are surrounded by a super-absorbent water-swellable coating, which helps the filler rods limit water penetration between gaps formed at the intersection of the buffer tubes and the outer jacket of the fiber optic cable. To promote increased adherence of the water-swellable coating to the core, the core of the filler rods disclosed in the '512 patent is non-round, which increases the surface area of the core that is available for contact with and adherence to the water-swellable coating.

Although the filler rods of the '512 patent have non-circular cores, nowhere does the '512 patent suggest to replace any buffer tube with a filler rod as described therein. The cross-sectional shape of such filler rods is taught to have been designed for performing a different function.

Applicant has identified that known designs for stranded loose-tube cables with dummy rods, such as those described above, have several manufacturing and operational deficiencies. In particular, conventional dummy rods, even those formed by simple extrusion, still tend to require an excessive amount of material, which increases cable costs. Furthermore, Applicant has also observed that filler rods designed for a function other than replacing buffer tubes and having a non-circular cross-sectional configuration lack cross-sectional dimensions that make them suitable replacements for buffer tubes in stranded loose-tube cables, particularly because the shapes of said filler rods do not encompass a cross-sectional shape and area that is substantially similar to that of the buffer tube.

SUMMARY OF THE DISCLOSURE

Applicant has found that a dummy rod having a non-round or non-circular cross-section, having substantially the same diameter, at its widest point of cross-section, as the diameter of a buffer tube can effectively replace such buffer tube when the dummy rod has a cross-sectional area lower than a predetermined amount of the cross-sectional area of the buffer tube to be replaced.

Surprisingly, Applicant has found that dummy rods with the above-mentioned characteristics, while reducing the amount of material required for the manufacturing thereof, do not demand additional water-blocking elements or materials. In fact, despite such a cross-sectional reduction of area and the presence of longitudinal voids in the non-round dummy rod, the amount of water-blocking material required to block water penetration according to industry standards does not have to be increased from the amount typically found in stranded optical fiber cables employing conventional dummy rods (i.e. those having the same circular cross-section as the tubes they replace).

In accordance with one embodiment, the present disclosure is directed to an optical fiber cable, comprising a polymeric jacket and at least one elongated buffer tube having a substantially circular cross-section and at least one optical fiber disposed within the at least one buffer tube. The optical fiber cable also comprises at least one dummy rod, disposed as a simulated buffer tube and having a substantially non-circular cross-section. The cross-sectional area of each dummy rod is at least 10% less than the cross-sectional area of the at least one elongated buffer tube. The optical fiber cable can also comprise an elongated core member disposed substantially within the polymeric jacket. The at least one elongated buffer tube and the at least one dummy rod can be disposed about the elongated core member.

According to one embodiment, a width of the at least one dummy rod, as measured across the widest cross-sectional extension of the at least one dummy rod, is about the same as the diameter of the cross-section of the at least one elongated buffer tube along a majority of the length of the at least one dummy rod.

Alternatively or additionally, the non-circular cross-section of the dummy rod is formed by at least one projection that extends outwardly from a point located at or near a center portion of the at least one dummy rod. The at least one projection has a width that is about the same as the radius of the at least one elongated buffer tube along a majority of the length of the at least one dummy rod.

It is contemplated that, in addition to dummy rods having a single-projection configuration, the dummy rod may comprise a plurality of projections that are spaced evenly about a central axis of the at least one dummy rod. Adjacent projections of the plurality of projections may be configured to prevent the at least one elongated buffer tube from interlocking with the at least one dummy rod.

According to one embodiment, the dummy rod may be produced and shaped by extruding a suitable material through a die, such that the desired cross-sectional pattern is sized so that a circle of the same diameter as the at least one buffer tube circumscribes the at least one dummy rod.

The cross-sectional shape of the at least one dummy rod may be configured such that the at least one projection is substantially rectangular in shape. The peripheral edges of such rectangularly-shaped projection may be curved or "radiused" to the same degree as a circle that can circumscribe the rod, with the vertices of the rectangular shape rounded. In the case of at least two of rectangularly-shaped projections, the space or void defined by such adjacent projections may be triangular in shape.

Alternatively, the cross-sectional shape of the at least one dummy rod may be configured such that the at least one projection is substantially club-like in shape. In the case of at least two of club-like projections, the space or void defined by such adjacent projections may be rectangular in shape.

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

DESCRIPTION OF THE EMBODIMENTS

Figure 1:
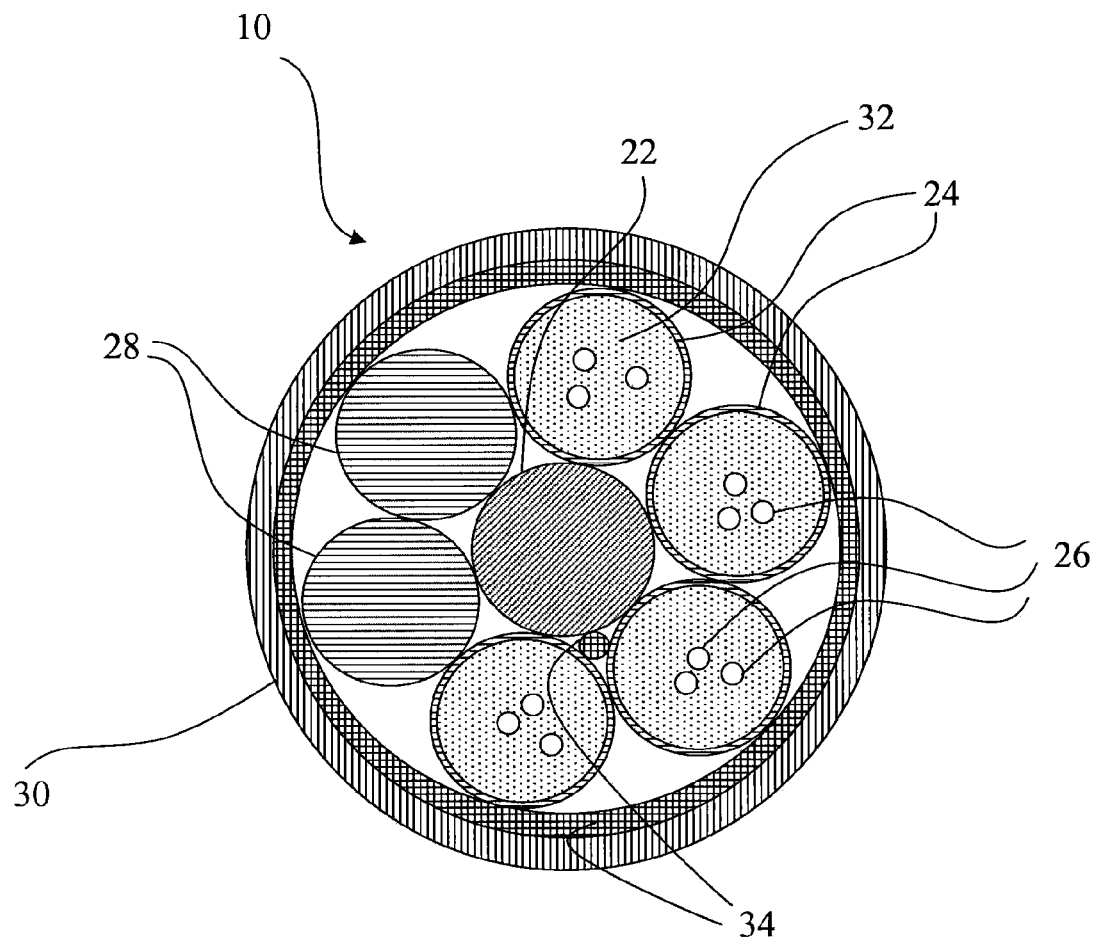
FIG. 1 is a cross-sectional view of a conventional stranded optical fiber cable with two of the buffer tube positions replaced by dummy rods.

Embodiments consistent with the present disclosure will now be described more fully hereinafter with reference to the accompanying drawings. The present disclosure, however, may be embodied in many different forms and should not be construed as limited to the embodiments set forth herein. In the drawings, wherever possible, like numbers refer to like elements.

FIG. 1 provides a cross-sectional view of a conventional stranded optical fiber cable, in which two buffer tube positions have been replaced with dummy rods. As illustrated in FIG. 1, a stranded optical fiber cable 10 generally comprises: an elongated core member 22, a plurality of optical fiber buffer tubes 24 loosely housing optical fibers 26, two dummy rods 28 of solid or foamed material made of the same material as the buffer tubes 24, and an outer jacket 30. Optical fiber cable 10 may also include water-blocking material 32 inside the buffer tubes 24 and water blocking elements 34 to block water in the interstices between buffer tubes 24, dummy rods 28, and elongated core member 22 and between buffer tubes 24 and outer jacket 30. Buffer tubes 24 and dummy rods 28 may be stranded in a helical or a reverse-oscillating lay (i.e., "S-Z strand") around the elongated core member 22.

Elongated core member 22 is a central strength member, which may be constructed of one or more materials suitable for strengthening optical fiber cables from compressive, tensile, and/or other forces under which optical fiber cable 10 may be exposed. The elongated core member 22 is generally disposed within outer jacket 30, substantially along a central longitudinal axis of optical fiber cable 10, in order to equally disperse any compressive or tensile forces applied longitudinally along optical fiber cable 10. Elongated core member 22 may be made of metal (e.g. steel, polymer-coated metal (for example coated by polyethylene)) or of polymeric material (e.g. polyamides and/or aramids, said polymeric material being optionally reinforced with glass fiber, graphite, inorganic, and/or carbon fillers.)

Buffer tubes 24 may be constructed of any material suitable for the housing of optical fibers 26 therein. For example, buffer tubes 24 may be constructed of polybutylene terephtalate (PBT), high density polyethylene, polypropylene, polypropylene-polyethylene copolymers, polyethylene or polypropylene with a modified polyphenylene oxide, or any other suitable material. Typically, buffer tubes 24 have a substantially circular cross-sectional shape.

Water-blocking material 32 may embody any material suitable for resisting or preventing moisture penetration, mitigating the spread of moisture, and/or wicking, removing, dispersing, or facilitating the timely evaporation or removal of moisture. For example, buffer tubes 24 may be filled with a thixotropic gel or a super absorbent powder (SAP). Alternatively or additionally, buffer tubes 24 may include water-blocking elements such as SAP, SAP-impregnated yarns, SAP impregnated tapes, or a combination thereof. Water-blocking material 32 inside buffer tube 24 could also be a solid or multi-layer plug material or insert, as described, for example, in one or more of U.S. Pat. Nos. 6,374,023; 6,463,199; 6,847,768; and 7,277,615.

Water-blocking elements 34 may embody one or more materials suitable for preventing moisture penetration into, mitigating the spread of moisture within, and/or wicking, removing, dispersing, or facilitating the timely evaporation or removal of moisture from the interstices between outer jacket 30 and buffer tubes 24 (and/or dummy rods 28) and between buffer tubes 24 (and/or dummy rods 28) and elongated core member 22. For example, water-blocking elements 34 may include a gel or gel-like flooding compound and/or one or more of the SAP-based elements described above. According to one exemplary embodiment, a water-blocking element 34 may embody an SAP-impregnated tape may be wrapped or wound around elongated core member 22. Alternatively or additionally, water-blocking element 34 may include an SAP-impregnated yarn that is longitudinally disposed along elongated core member 22. According to yet another exemplary embodiment, water-blocking element 34 may embody SAP-impregnated yarns that may be longitudinally disposed or wound around, among, and/or between buffer tubes 24 and dummy rods 28.

Outer strength members (not shown) such as fiberglass or aramid yarns may be wrapped around elongated core member 22 or otherwise disposed within outer jacket 30. Outer strength members may be optionally employed when, for example, fiber optic cable 10 is expected to be subjected to high tensile or compressive forces. For example, in fiber optic cable designs that require large fiber counts (resulting in a relatively heavy cable), outer strength members may be employed to counteract tensile or compressive forces arising from the additional weight of the cable.

As illustrated in FIG. 1 and as previously discussed, conventional dummy rods 28 are typically constructed as a solid cylindrical rod of the same material as buffer tubes 24. In some cases, conventional dummy rods 28 are partially foamed, which may reduce the density and weight of the dummy rod 28. In other cases, conventional dummy rods 28 may be constructed with an inexpensive solid or stranded core material that is jacketed and/or coated with the same or similar material as buffer tubes 24. Conventional dummy rods 28 generally have a circular cross-section that occupies the same cross-sectional area of buffer tubes 24, thereby allowing dummy rods 28 to closely simulate the structural performance of buffer tubes 24.

Figure 2:
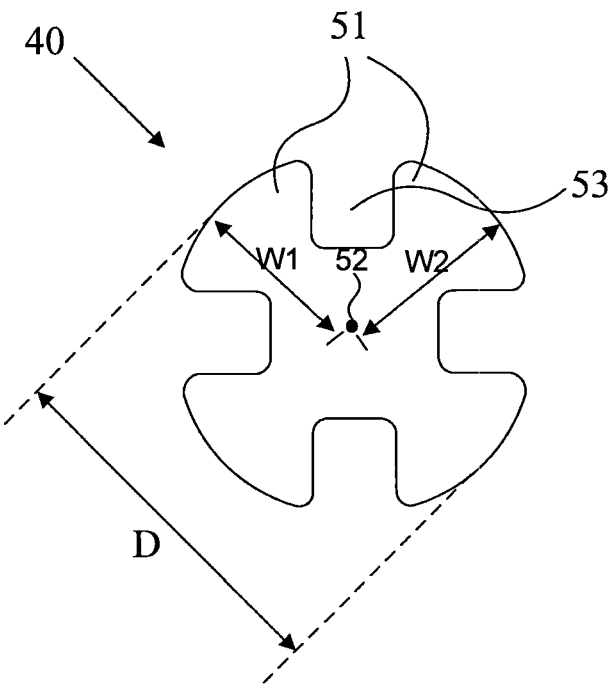
FIG. 2 is a cross-sectional view of an exemplary configuration of a dummy rod having substantially club-shaped projections, consistent with certain disclosed embodiments.
Figure 3:
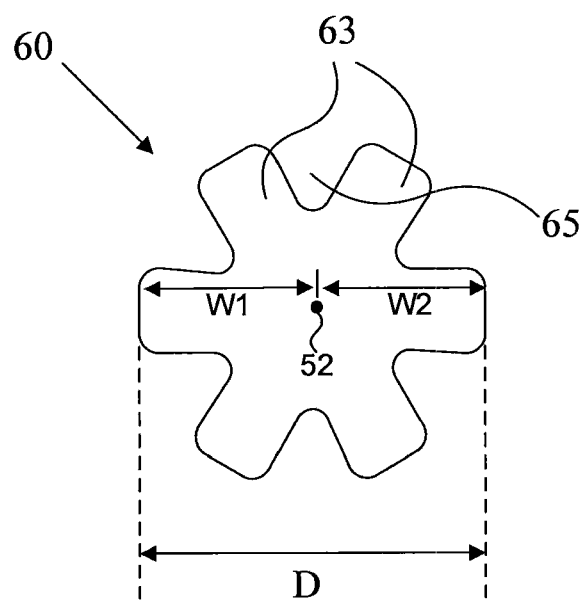
FIG. 3 is a cross-sectional view of an exemplary configuration of a dummy rod having substantially rectangular projections, consistent with the disclosed embodiments.

FIGS. 2 and 3 illustrate exemplary cross-sections of dummy rods 40, 60 consistent with certain disclosed embodiments. As illustrated in FIGS. 2 and 3, each of dummy rods 40, 60 comprises a non-circular cross-section that has significantly less cross-sectional surface area than that of a conventional dummy rod having a circular cross section of diameter D (as illustrated, for example, in FIG. 1).

According to the embodiment illustrated in FIGS. 2 and 3, each of dummy rods 40, 60 may have a non-circular cross-section that is defined by a plurality of projections 51, 63, which extend outwardly from a central portion 52 of dummy rods 40, 60. Dummy rods 40, 60 may be configured for placement around an elongated core member (e.g., elongated core member 22 of FIG. 5) to simulate the structural performance or behavior of a buffer tube.

In order to facilitate simulation of the performance of a buffer tube, dummy rods 40, 60 may include one or more structural features that are the same or similar to a buffer tube. For example, each of dummy rods 40, 60 of FIGS. 2 and 3 is configured with a width, as measured across the widest cross-section extension thereof that is about the same as the diameter of a buffer tube. It is contemplated that, to the extent that width of non-circular dummy rods 40, 60 differ from the diameter of a buffer tube, the difference between the width of dummy rods 40, 60 and the buffer tube is not greater than about 10% along a majority of the length of the dummy rods.

As explained, the non-circular cross-sections of dummy rods 40, 60 of FIGS. 2 and 3 may be formed by a plurality of projections 51, 63 that extend outwardly from a central portion 52 of dummy rods 40, 60, such that the width (or "diameter") D of dummy rods 40, 60, as measured across the widest cross-sectional extension, has substantially the same diameter as buffer tubes 24. Alternatively or additionally, particularly in the case where a dummy rod has an odd-number of outwardly extending projections (not shown), the dummy rod may be constructed such that the width W1, W2 of one or more of the plurality of projections 51, 63 may be about the same as the radius of a buffer tube.

Contiguous (i.e., adjacent) projections 51, 63 of FIGS. 2 and 3 define voids 53, 65, the shape of which depends upon the shape of projections 51, 63. For the "club-shaped" projections of the exemplary embodiment illustrated in FIG. 2, void 53 embodies a substantially rectangular shape. The cross-sectional area of the dummy rod 40 of the embodiment illustrated in FIG. 2 is about 31% less than the cross-sectional area of each of buffer tubes 24.

It should be noted that different configurations of dummy rods may be realized by adjusting the shape and/or size of the projections. It is contemplated that such adjustments may result in a reduction of cross-sectional area of the dummy rod that may be more or less than that illustrated in FIG. 2, depending upon the corresponding size and shape of void created by the adjacent projections.

For example, as illustrated in the exemplary embodiment FIG. 3, dummy rod 60 may include substantially rectangular projections 63 defining substantially triangular voids 65. In this embodiment, the cross-sectional area of the dummy rod 60 is about 29% less than the cross-sectional area of each of buffer tubes 24. As outlined above, the reduction of cross-sectional area of dummy rod 60 may depend upon the corresponding size and shape of void 65 created by adjacent projections 63.

It is contemplated that, although certain configurations and shapes of dummy rods are explicitly illustrated and described herein, other configurations and shapes of dummy rods may be employed without departing from the scope of the present disclosure. Such configurations and shapes may result in dummy rods designed consistent with the present disclosure having a cross-sectional area that is about 10% to about 50% less than the cross-sectional area of buffer tubes 24. Regardless of the configuration and shapes of dummy rods used, the width and depth of voids created by contiguous projections, when present, should be such that portions of an adjacent buffer tube or an adjacent dummy rod do not become interlocked within the void(s).

Dummy rods 40, 60 may be constructed of any material suitable for providing substantially the same structural performance of buffer tubes 24 containing optical fibers 26 and water-blocking material 32. For example, dummy rods 40, 60 may be manufactured from the same material as that used to manufacture buffer tubes 24 of optical fiber cable 10. Alternatively, dummy rods 40 and 60 may be constructed from one or more of polybutylene terephthalate (PBT), high density polyethylene, polypropylene, polypropylene-polyethylene copolymers, polyethylene or polypropylene with a modified polyphenylene oxide, or any other suitable material.

Dummy rods 40, 60 may be produced and shaped by extruding a suitable material from which dummy rods 40, 60 are manufactured (such as those described above) through a die (not shown), such that the desired cross-sectional pattern (e.g., projections 51, 63) may be extended along at least a particular length of dummy rod. The desired cross-sectional pattern is generally extended along the entire longitudinal length of the dummy rod. It is contemplated, however, that certain irregularities and/or discontinuities may exist such that the cross-sectional pattern may be interrupted, distorted, and/or disfigured over certain longitudinal portions of the dummy rod.

According to one embodiment, projections 51, 63 of FIGS. 2 and 3 may be produced by extruding the raw material through a stationary die, thereby creating projections having orientations that do not substantially change (i.e., do not rotate) along a longitudinal axis of the dummy rod. According to another embodiment, the dummy rod may be extruded through a rotating die, resulting in projections that are formed in a helical pattern, rotating with respect to a central axis of the dummy rod along the longitudinal length of the dummy rod. In the first case, the at least one dummy rod is preferably elastically twisted while being stranded together with the at least one buffer tube with a pitch different—either longer or shorter—than the stranding pitch of the buffer tube(s), thereby ensuring no jamming may take place with the buffer tube(s) or between two adjacent dummy rods. In the case the dummy rod has been extruded with a rotating die thereby being already shaped with helical pattern, jamming is equally prevented.

Optionally, dummy rods 40, 60 may be constructed from and/or coated in foam in a manner well known to those of ordinary skill in the art. According to one exemplary embodiment, dummy rods 40, 60 may be foamed up to about 10% without adversely affecting the mechanical properties of optical fiber cable 10. Coupled with the exemplary reduction of cross-sectional area of exemplary dummy rods 40, 60 having non-circular cross section when compared with conventional (i.e., circular cross-section) dummy rod construction, the amount of material reduction for dummy rods could be from about 20% to about 60% relative to a conventional dummy rod 28 of FIG. 1.

As an alternative or in addition to the non-circular cross-section of dummy rod 40 being formed by a plurality of outwardly-extending projections (e.g., projections 51, 63 illustrated in FIGS. 2 and 3), it is contemplated that dummy rods may be manufactured to possess non-circular cross-sections without such projections. For example, FIGS. 4a and 4b, provide exemplary embodiments of dummy rods, each having substantially non-circular cross-sections without necessarily possessing discrete "projections."

Figure 4A:
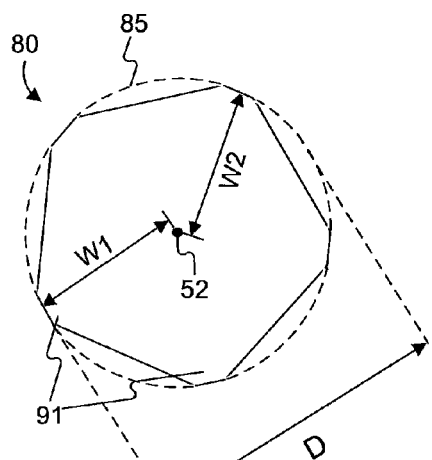
FIG. 4a is a cross-sectional view of an exemplary configuration of a dummy rod having a pentagon-like cross-sectional shape, consistent with the disclosed embodiments.

FIG. 4a, illustrates a pentagon-like dummy rod configuration 80, which occupies considerably less cross-sectional area than a conventional dummy rod having a circular cross-section. Such a configuration may be produced by extruding the dummy rod material through a die that essentially "trims" certain arcs along the circumference of the cross-section, thereby forming a pentagon-like shape, having outwardly-directed extensions 91. The width (W1 or W2) of at least one of extensions 91 is substantially the same as the radius of a buffer tube of the optical fiber cable in which dummy rod 80 is deployed. It should be noted that, although the width of the widest cross-sectional extension of dummy rod 80 may be less than the diameter of a buffer tube, dummy rod 80 may be designed such that the diameter of a circle that circumscribes each of the edges of dummy rod 80 is typically about the same as the diameter of a buffer tube.

Figure 4B:
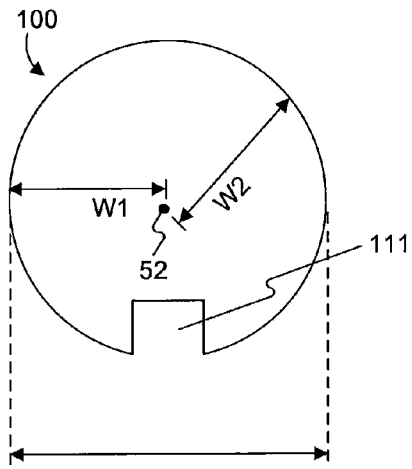
FIG. 4b is a cross-sectional view of an exemplary configuration of a dummy rod having a non-circular cross-section, consistent with the disclosed embodiments.

Another possible configuration of a dummy rod having a non-circular cross section, without necessarily including discrete "projections," is illustrated in FIG. 4b. FIG. 4b provides a cross-sectional view of a dummy rod configuration with a substantially non-circular cross-section that is formed by extruding the dummy rod through a notched die, which creates a circumferential discontinuity when compared to a dummy rod having a substantially circular cross-section. Such a circumferential discontinuity may reduce the cross-sectional area of the dummy rod when compared to a conventional dummy rod having a substantially circular cross-section. Such a reduction in cross-sectional area may significantly reduce the amount of material used in the construction of the cable, thereby reducing material costs associated with the manufacturing of the dummy rods.

Figure 4C:
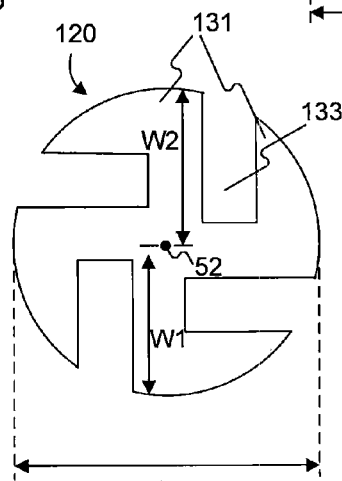
FIG. 4c is a cross-sectional view of another exemplary configuration of a dummy rod having a non-circular cross-section, consistent with the disclosed embodiments.
Figure 4D:
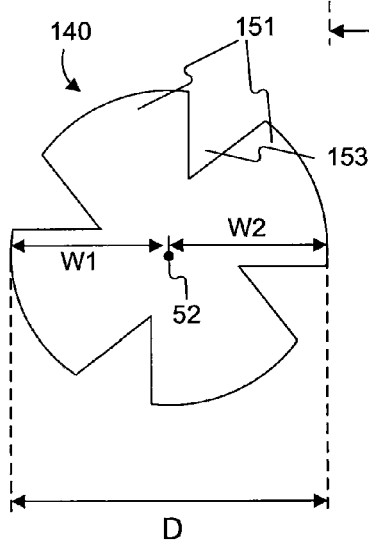
FIG. 4d is a cross-sectional view of yet another exemplary configuration of a dummy rod having a non-circular cross-section, consistent with the disclosed embodiments.

Other dummy rods having substantially non-circular cross-sections may be created by using dies that create "circumferential discontinuities," such as the one shown in FIG. 4b. For instance, FIGS. 4c and 4d illustrate exemplary embodiments of dummy rods 120, 140 in which projections 131, 151 (and voids 133, 153) are formed by extruding dummy rod material through dies of appropriate shape. The width (W1 or W2) of at least one of projections 131, 151 is substantially the same as the radius of a buffer tube of the optical fiber cable in which dummy rods 120, 140 are deployed. It should also be noted that the widest cross-sectional extension (or, alternatively, the sum of the widths of two projections 131, 151 (i.e., W1+W2) of dummy rods 120 and 140) may be about the same as the diameter of a buffer tube, as is illustrated for the dummy rods 40, 60 of FIGS. 2 and 3.

Figure 4E:
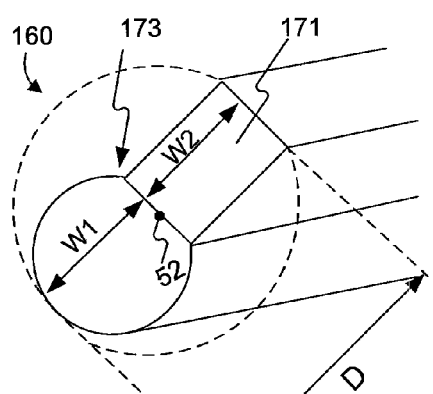
FIG. 4e is a perspective view of yet another exemplary configuration of a dummy rod having a non-circular cross section, consistent with the disclosed embodiments.

Another dummy rod having a non-circular cross-section is illustrated in FIG. 4e. FIG. 4e provides a perspective view of dummy rod 160 having at least one outwardly-extending projection 171. The width W2 of the at least one projection 171 may be substantially the same as the radius of a buffer tube of the optical fiber cable in which dummy rod 160 is deployed. It should also be noted that the widest cross-sectional extension (i.e., the sum of the widths (W1+W2)) of dummy rod 160 may be about the same as the diameter D of a buffer tube.

Figure 5:
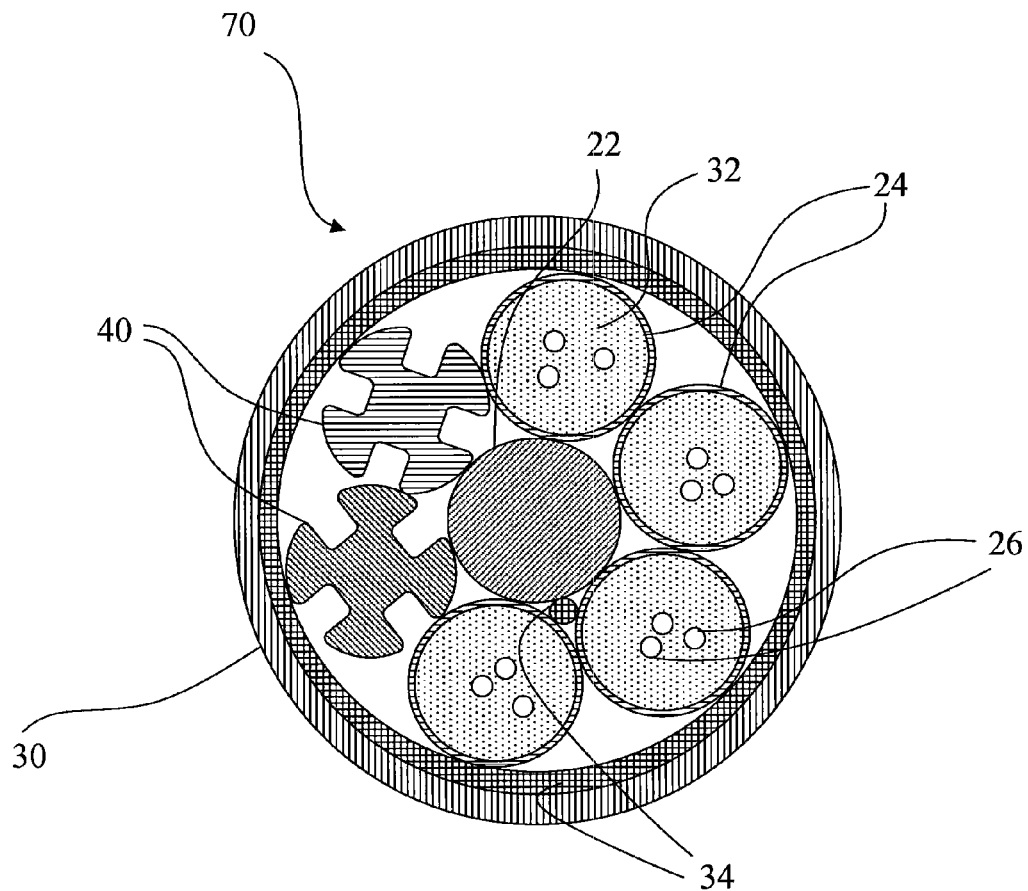
FIG. 5 is a cross-sectional view of an optical fiber cable employing the exemplary dummy rods having a non-circular cross-section that are illustrated in FIG. 2.

FIG. 5 illustrates a stranded optical fiber cable 70 employing two of dummy rods 40, which are illustrated in the exemplary embodiment of FIG. 2. All other components in FIG. 5 are substantially the same as those illustrated in FIG. 1. Note that neither buffer tubes 24 nor projections of an adjacent dummy rod can interlock with the voids of either of filler rods 40.

Surprisingly, despite a reduction in the cross-sectional area of the dummy rods and the presence of longitudinal voids in the non-round dummy rods, a cable constructed consistent with the present disclosure does not require an increase in the number of SAP water-blocking elements required to block water penetration according to industry standards when compared with the number typically found in stranded optical fiber cables employing conventional (i.e. circular cross-section) dummy rods.

Two stranded optical fiber cables were constructed consistent with the embodiments described herein and subjected to testing. The cables each comprised a central strength member, an SAP-impregnated yarn, longitudinally disposed along the central strength member, one gel-filled polyethylene buffer tube containing 12 optical fibers and 4 non-round polyethylene dummy rods (one cable having dummy rods as illustrated in FIG. 2, and the second cable having dummy rods as illustrated in FIG. 3). The buffer tube and dummy rods were "S-Z stranded" around the central strength member and bound with a polyester binders, an SAP-impregnated tape longitudinally wrapped around the stranded core, all of which was enclosed in a medium density polyethylene (MDPE) jacket.

Both cables were subjected to water penetration tests according to the Telecordia Standard GR-20 industry specification, which requires a cable not allow water penetration of more than 3 meters under a static head of 1-meter pressure for 24 hours. Both cables passed the water penetration testing.

The cable with dummy rods configured as illustrated in the exemplary embodiment shown in FIG. 2 was subjected to testing for compressive strain, tensile stress, temperature cycling, and cable aging according to industry standard Telecordia Standard GR-20.

Telecordia Standard GR-20 requires that 90% of the optical fibers have an average change of attenuation of less than or equal to 0.05 dB/km with the largest change to be less than or equal to 0.15 dB/km under a compressive strain for 220 N/m for 1 minute and 100 N/m for 10 minutes. 100% of the optical fibers contained in the cable of the associated with the present disclosure showed less than 0.15 dB/km attenuation increase, with an average attenuation increase less than 0.05 dB/km.

Telecordia Standard GR-20 specifies a tensile stress test under the rated installation load of a cable for 1 hour, that is with the cable under 600 pounds (272.16 kg) of tension for 1 hour, the fiber must experience less than 60% of its proof strain, and less than 20% of its proof strain under a tension of 180 pounds (81.65 kg). A cable of constructed consistent with embodiments described in the present disclosure experienced 52.2% of its proof strain at 600 pounds (272.16 kg) for 1 hour, and 8.4% of its proof strain at 180 pounds (81.65 kg), therefore passing the Telecordia Standard GR-20 standard.

Industry standard Telecordia Standard GR-20 requires outdoor optical fiber cables to be temperature cycled between −40° C. and +70° C. on the cable reel to ensure good temperature and aging performance. The Telecordia GR-20 specification requires that 90% of the optical fibers have an average change of attenuation of less than or equal to 0.05 dB/km with the largest change to be less than or equal to 0.15 dB/km at the temperature extremes. A cable consistent with one or more presently disclosed exemplary embodiments was temperature cycled and aged according the Telecordia GR-20 specification.

Data from these tests is presented in Table 1 below. As can be seen from the data, the cable constructed consistent with the embodiments described herein met the Telecordia GR-20 specifications cable aging and temperature cycling.

TABLE 1

Telecordia GR-20 (−40 C. to +70 C. cycling and Aging attenutation data)

| Fiber Color | Baseline Data +23 C. dB/km | Temperature Cycling | | | | Cable Aging Residual | |
|---|---|---|---|---|---|---|---|
| | | −40 C. dB/km | Delta dB/km | +70 C. dB/km | Delta dB/km | +23 C. dB/km | Delta dB/km |
| Blue | 0.190 | 0.190 | 0.000 | 0.210 | 0.020 | 0.200 | 0.010 |
| Orange | 0.190 | 0.190 | 0.000 | 0.200 | 0.010 | 0.190 | 0.000 |
| Green | 0.190 | 0.200 | 0.010 | 0.190 | 0.000 | 0.210 | 0.020 |
| Brown | 0.180 | 0.190 | 0.010 | 0.200 | 0.020 | 0.190 | 0.010 |
| Slate | 0.190 | 0.200 | 0.010 | 0.200 | 0.010 | 0.190 | 0.000 |
| White | 0.200 | 0.200 | 0.000 | 0.210 | 0.010 | 0.200 | 0.000 |
| Red | 0.190 | 0.190 | 0.000 | 0.200 | 0.010 | 0.200 | 0.010 |
| Black | 0.190 | 0.200 | 0.010 | 0.220 | 0.030 | 0.200 | 0.010 |
| Yellow | 0.190 | 0.200 | 0.010 | 0.220 | 0.030 | 0.200 | 0.010 |
| Violet | 0.190 | 0.190 | 0.000 | 0.200 | 0.010 | 0.200 | 0.010 |
| Rose | 0.190 | 0.200 | 0.010 | 0.230 | 0.040 | 0.210 | 0.020 |
| Aqua | 0.190 | 0.200 | 0.010 | 0.220 | 0.030 | 0.190 | 0.000 |
| Number Singlemode Test Fibers | | 12.000 | | 12.000 | | 12.000 | |
| Minimum Increase | | | 0.000 | | 0.000 | | 0.000 |
| Maximum Increase | | | 0.010 | | 0.040 | | 0.020 |
| Average Increase | | | 0.010 | | 0.020 | | 0.010 |
| Standard Deviation | | | 0.005 | | 0.011 | | 0.007 |

Other embodiments of the present disclosure will be apparent to those skilled in the art from consideration of the specification and practice of the disclosure disclosed herein. It is intended that the specification and examples be considered as exemplary only, with true scope and spirit of the disclosure being indicated by the following claims.

What is claimed is:

1. An optical fiber cable, comprising:
a polymeric jacket;
at least one elongated buffer tube having a substantially circular cross-section;
at least one optical fiber disposed within the at least one buffer tube; and
at least one dummy rod, stranded together with said at least one buffer tube and having a substantially non-circular cross-section, wherein the cross-sectional area of each dummy rod is at least 10% less than the cross-sectional area of the at least one elongated buffer tube along a majority of the length of the at least one dummy rod,
wherein the non-circular cross-section is formed by at least one projection that extends outwardly from a point located at or near a center portion of the at least one dummy rod, wherein the at least one projection has a width that is about the same as the radius of the at least one elongated buffer tube along a majority of the length of the at least one dummy rod, wherein a diameter of a circle circumscribing a peripheral edge of the at least one projection is within about 10% of a diameter of the at least one elongated buffer tube, and wherein an arc of the circle circumscribes the peripheral edge.

2. The optical fiber cable of claim 1, further comprising an elongated core member disposed substantially within the polymeric jacket, wherein the at least one elongated buffer tube and the at least one dummy rod are disposed about the elongated core member.

3. The optical fiber cable of claim 1, wherein a width of the at least one dummy rod, as measured across the widest cross-sectional extension of the at least one dummy rod, is about the same as the diameter of the cross-section of the at least one elongated buffer tube along a majority of the length of the at least one dummy rod.

4. The optical fiber cable of claim 1, wherein the at least one projection includes a plurality of projections that are spaced evenly about a central axis of the at least one dummy rod.

5. The optical fiber cable of claim 4, wherein adjacent projections of the plurality of projections are configured to prevent the at least one elongated buffer tube from interlocking with the at least one dummy rod.

6. The optical fiber cable of claim 4, wherein the at least one dummy rod includes first and second dummy rods, wherein adjacent projections of each of the first and second dummy rods are configured to prevent the first and second dummy rods from interlocking.

7. The optical fiber cable of claim 1, wherein the at least one projection is substantially rectangular in shape.

8. The optical fiber cable of claim 1, wherein the at least one projection is substantially club-shaped.

9. The optical fiber cable of claim 1, wherein each of the at least one elongated buffer tube and the at least one dummy rod is adjacent to the elongated core member.

10. The optical fiber cable of claim 1, wherein the cross-sectional area of the at least one dummy rod is at least 15 percent less than the cross-sectional area of the at least one elongated buffer tube.

11. The optical fiber cable of claim 1, wherein the cross-sectional area of the at least one dummy rod is at least 25 percent less than the cross-sectional area of the at least one elongated buffer tube.

12. The optical fiber of claim 1, wherein the cross-sectional area of the at least one dummy rod is between about 30 percent less and about 50 percent less than the cross-sectional area of the at least one elongated buffer tube.

13. The optical fiber of claim 1, wherein the at least one dummy rod is foamed up to about 10%.

* * * * *